US006821467B2

(12) United States Patent
Wolfe et al.

(10) Patent No.: US 6,821,467 B2
(45) Date of Patent: Nov. 23, 2004

(54) METHOD OF MAKING A THIN FILM KEYPAD

(75) Inventors: Christopher M. Wolfe, Derry, NH (US); Steven M. Dunham, Weare, NH (US)

(73) Assignee: Multi-National Resources, Exeter, NH (US)

( * ) Notice: Subject to any disclaimer, the term of this patent is extended or adjusted under 35 U.S.C. 154(b) by 259 days.

(21) Appl. No.: 09/945,146

(22) Filed: Aug. 31, 2001

(65) Prior Publication Data

US 2003/0043995 A1 Mar. 6, 2003

(51) Int. Cl.[7] .......................... B29C 45/14; B29C 65/56; B29C 65/70

(52) U.S. Cl. ....................... 264/155; 264/154; 264/250; 264/251; 264/266; 264/267; 264/268; 264/273; 264/274

(58) Field of Search ................................ 264/154, 155, 264/156, 163, 241, 250, 251, 259, 261, 263, 267, 268, 273, 274, 275; 200/341, 345, 275, 511, 512, 513

(56) References Cited

U.S. PATENT DOCUMENTS

| | | | | | |
|---|---|---|---|---|---|
| 4,202,091 | A | * | 5/1980 | Ohnishi | 29/527.1 |
| 4,395,817 | A | * | 8/1983 | Asada et al. | 29/622 |
| 4,464,326 | A | * | 8/1984 | Nishihira | 264/246 |
| 4,729,679 | A | * | 3/1988 | Hou | 400/490 |
| 4,818,829 | A | | 4/1989 | Nopper et al. | 200/512 |
| 4,830,809 | A | * | 5/1989 | Liebl et al. | 264/257 |
| 5,280,146 | A | * | 1/1994 | Inagaki et al. | 200/341 |
| 5,399,821 | A | | 3/1995 | Inagaki et al. | 200/341 |
| 5,666,112 | A | | 9/1997 | Crowley et al. | 341/22 |
| 5,672,405 | A | | 9/1997 | Plank, Jr. et al. | 428/133 |
| 5,681,515 | A | | 10/1997 | Pratt et al. | 264/153 |
| 5,795,525 | A | | 8/1998 | Naritomi | 264/251 |
| 5,807,002 | A | | 9/1998 | Tsai | 400/494 |
| 5,894,006 | A | * | 4/1999 | Herbst | 264/132 |
| 5,909,021 | A | | 6/1999 | Duffy | 200/514 |
| 5,989,480 | A | * | 11/1999 | Yamazaki | 264/511 |
| 6,103,346 | A | * | 8/2000 | Nakajo et al. | 428/172 |
| 6,264,869 | B1 | * | 7/2001 | Notarpietro et al. | 264/247 |
| 6,573,463 | B2 | * | 6/2003 | Ono | 200/5 A |
| 6,576,856 | B2 | | 6/2003 | Masaru et al. | 200/512 |
| 6,635,210 | B2 | * | 10/2003 | Nilsson et al. | 264/155 |
| 6,660,200 | B2 | * | 12/2003 | Nakajo | 264/154 |

* cited by examiner

*Primary Examiner*—Angela Ortiz
(74) *Attorney, Agent, or Firm*—Grossman Tucker Perreault & Pfleger, PLLC

(57) ABSTRACT

A thin film keypad includes a retainer sheet and a plurality of keycaps molded onto keycap attachment regions on the retainer sheet such that the keys are mechanically secured to the retainer sheet. The retainer sheet is made of a thin film material, such as polycarbonate or polyester, and each keycap attachment region includes at least a hole and/or at least one retainer anchor portion. The keycaps are molded from a plastic material, such as polycarbonate or polyester, ABS or a polycarbonate/ABS blend. The thin film material is placed in a molding tool and the plastic material is injected into a keycap mold cavity such that the plastic material flows through the holes and/or around the retainer anchor portions, thereby anchoring the keycaps to the retainer sheet.

9 Claims, 6 Drawing Sheets

METHOD OF MAKING A THIN FILM KEYPAD

TECHNICAL FIELD

The present invention relates to keypads and molding techniques and more particularly, relates to a thin film keypad and method of making the thin film keypad.

BACKGROUND INFORMATION

Electronic devices, such as wireless telephones, have drastically reduced in size. These devices include keypads that must also be reduced in size. In particular, the manufacturers of these electronic devices have demanded that the keypads be extremely thin. Attempts at reducing the size and thickness of these keypads have met with various difficulties.

According to one method of constructing thin keypads, the keys are adhered to a plastic film. However, the keys often would not adhere adequately, especially if the keys and film are made of different materials (e.g., keys made of ABS and film made of polycarbonate or polyester).

Another method of making keypads is the insert mold design (IMD) technique. According to this technique, a cavity is formed in the film and the key is molded into the cavity. As a result, however, the film is on the outside of the keypad and graphics are printed on the film. One disadvantage of keypads made using the IMD technique is the limited extent to which the film can be stretched while retaining graphic quality. The dimensions of the keys (i.e., the height) made using the IMD technique are also limited.

Accordingly, there is a need for a thin film keypad where the keys will remain secured to a top surface of the thin film, even when materials are used that do not adhere together well.

SUMMARY

In accordance with the needs addressed above, the present invention provides a thin film keypad and method of making same. According to one aspect of the present invention, the thin film keypad comprises a retainer sheet made of a thin film material and having a top and bottom surface. The retainer sheet includes at least one hole extending through the thin film material and at least one retainer anchor portion formed from a portion of the thin film material extending upwardly from the top surface. At least one keycap is molded onto a top surface of the retainer sheet and around the retainer anchor portion. The keycap includes a keycap anchor portion molded through the hole in the thin film material such that the keycap anchor portion and the retainer anchor portion mechanically secure the keycap to the retainer sheet.

According to another aspect of the present invention, the thin film keypad comprises a retainer sheet made of a thin film material and having a top and bottom surface. The retainer sheet includes a plurality of keycap attachment regions. Keycaps are molded onto a top surface of the retainer sheet at respective keycap attachment regions. The keycaps are molded around portions of the thin film material such that the keycaps are mechanically secured to the retainer sheet.

According to one embodiment, the thin film material is preferably a plastic material, such as polycarbonate or polyester, having a thickness in a range of about 0.005 in. (0.127 mm) to 0.010 in. (0.254 mm). The keycap is preferably made of a plastic material, such as polycarbonate, polycarbonate/ABS blend, or ABS.

One embodiment of the retainer sheet includes holes extending through the thin film material at the keycap attachment regions. The portions of the thin film material around which the keycaps are molded include edges of the thin film material around the holes. The portions of the thin film material around which the keycaps are molded also include flaps cut out from the thin film material and extending upwardly from the top surface.

According to further aspect of the present invention, a method of making a thin film keypad comprises forming at least one keycap attachment region on a thin film material with each keycap attachment region including at least one molding material passage region. The thin film material is placed into a molding tool having at least one keycap mold cavity such that each molding material passage region is located within each keycap mold cavity, respectively. A molding material is injected through the molding material passage region in the thin film material and into the keycap mold cavity such that at least one keycap is molded onto a top surface of the thin film material. The molding material flows around a portion of the thin film material such that the keycap is mechanically secured to the thin film material. The outline of the retainer sheet can then be cut from the thin film material such that the keys are molded onto the retainer sheet.

In one preferred method, forming each keycap attachment region includes forming at least one hole through the thin film material. The retainer sheet is placed in the molding tool with the hole positioned between the keycap mold cavity and an anchor mold cavity such that the molding material flows through each hole and around an edge of the thin film material. Forming the keycap attachment region also preferably includes cutting at least one flap from the thin film material to form the material passage region. The molding tool preferably includes a gate for injecting the molding material. Inserting the retainer sheet into the molding tool preferably includes inserting the gate through the material passage region such that the gate moves the flap into the keycap mold cavity. The molding material flows around each flap.

According to a further aspect of the present invention, a method of making a thin film keypad comprises forming a plurality of keycap attachment regions on a thin film material such that each keycap attachment region includes at least one hole and at least one material passage region. The thin film material is placed into a molding tool including a female side having keycap mold cavities and a male side having anchor mold cavities. The retainer sheet is positioned such that the holes are located between respective keycap mold cavities and anchor mold cavities and such that the material passage regions are located within respective keycap mold cavities. A molding material is injected through the material passage regions in the thin film material and into the keycap mold cavities. The molding material flows through the holes and into the anchor mold cavities such that keycaps are molded onto a top surface of the thin film material and are mechanically secured to the thin film material.

According to one method, forming the material passage regions includes cutting flaps from the thin film material. According to another method, forming the material passage regions includes forming formed hole portions from the thin film material.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
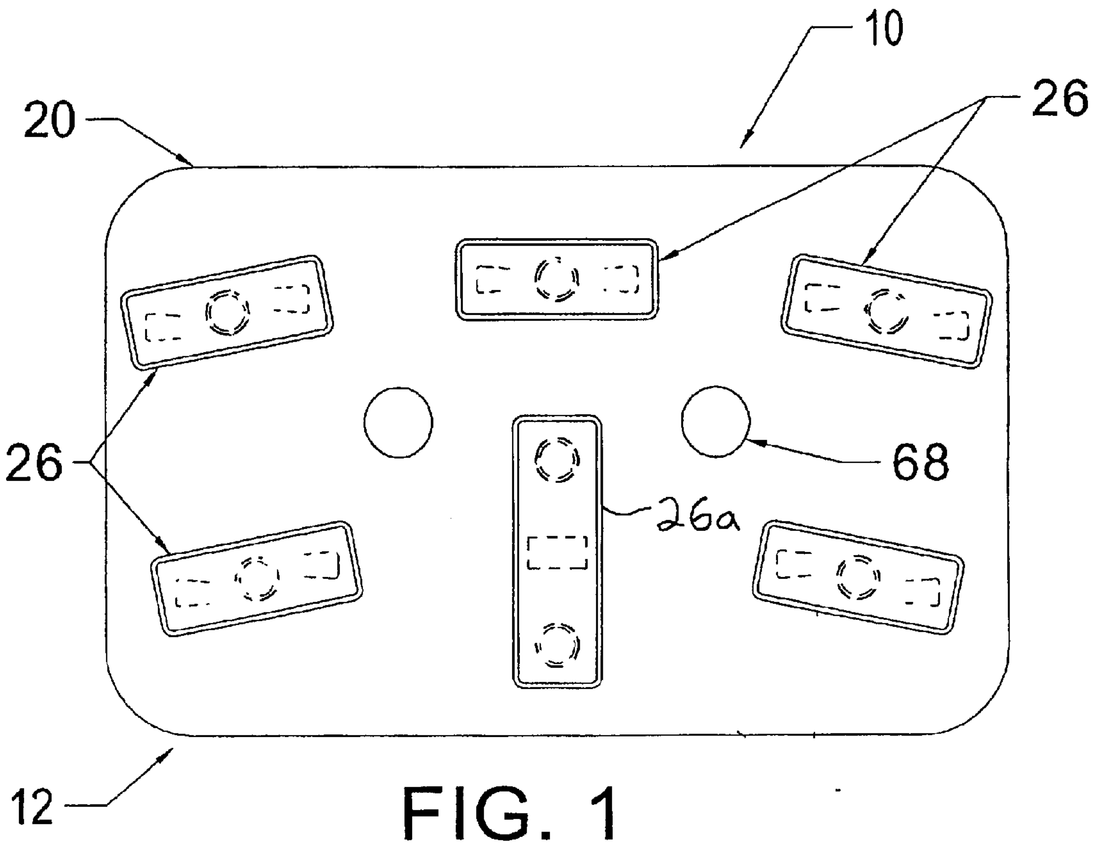
FIG. 1 is a plan view of a thin film keypad, according to one embodiment of the present invention.

A thin film keypad 10, FIG. 1, according to one embodiment of the present invention, includes a retainer sheet 20 and keycaps 26 secured to the retainer sheet 20. The exemplary thin film keypad 10 is designed for use in a wireless telephone, as well as other applications. Keypads made according to the present invention, however, can have other shapes, designs and layouts for use in other types of devices. Although the thin film keypad 10 is shown with a certain number of keycaps 26, any number of keycaps 26 can be secured to the retainer sheet 20.

Figure 2:
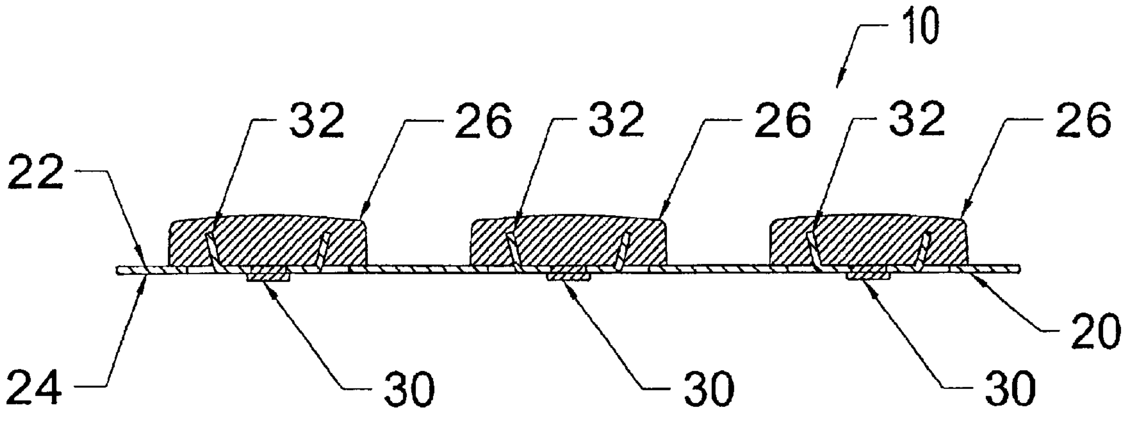
FIG. 2 is a side cross-sectional view of a thin film keypad, according to one embodiment of the present invention.

As shown in greater detail in FIG. 2, the retainer sheet 20 has top and bottom surfaces 22, 24. The keycaps 26 are preferably molded onto the top surface 22 of the retainer sheet 20 such that the material of the keycaps 26 is molded around a portion of the retainer sheet 20, as will be described in greater detail below. The preferred embodiment of each keycap 26 includes at least one keycap anchor portion 30 extending through and engaging the bottom surface 24 of the retainer sheet 20. The keycap anchor portion 30 also acts as an actuator in the wireless telephone or other device in which the keypad 10 is used. The preferred embodiment of the retainer sheet 20 includes at least one retainer anchor portion 32 extending into the material of each keycap 26.

The exemplary embodiment shows two retainer anchor portions 32 extending into each of the keycaps 26 and one keycap anchor portion 32 extending from each of the keycaps to securely anchor the keycaps 26. However, any number of retainer anchor portions 32 can extend into the keycap 26 and any number of keycap anchor portions 30 can extend from the keycap 26. The center keycap 26*a* shown FIG. 1, for example, includes two keycap anchor/actuator portions 30 without any retainer anchor portions 32. According to a further alternative, the keycap 26 can be secured using only retainer anchor portions 32 without any keycap anchor/actuator portions 30.

The retainer sheet 20 is made of a thin film material and preferably a plastic, such as a polycarbonate or polyester material. The keycaps 26 are also preferably made of a plastic material, such as polycarbonate, ABS, or a polycarbonate/ABS blend. Other types of materials are also contemplated for the retainer sheet 20 and keycaps 26.

Figure 3:
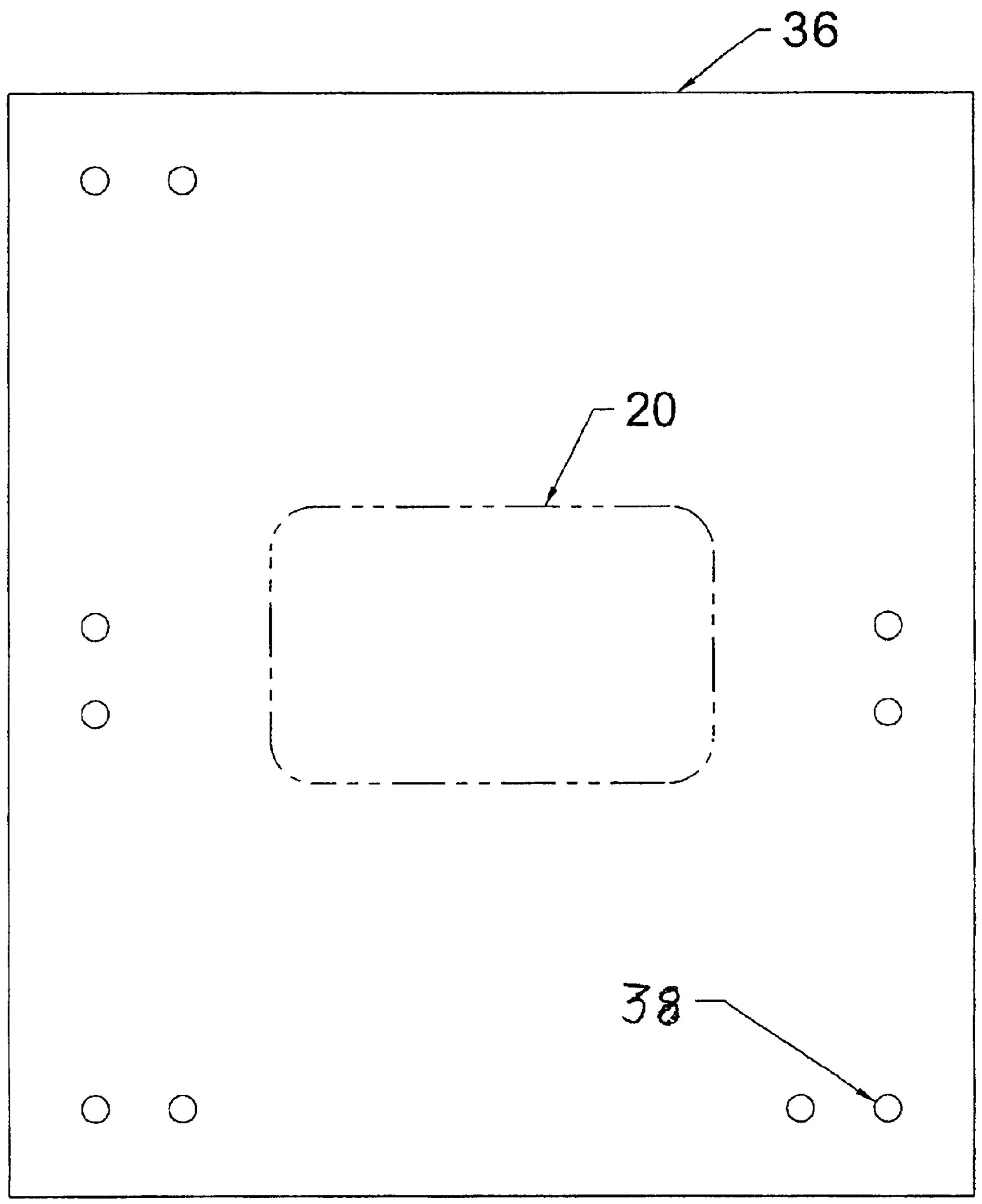
FIG. 3 is a plan view of a thin film material used to form a retainer sheet, according to one method of the present invention.

Referred to FIGS. 3–7, one method of making the thin film keypad 10 is described below. The retainer sheet 20 is formed from a thin film material 36 (FIG. 3). The thin film material 36 is preferably a plastic material, such as polycarbonate or polyester, having a thickness in the range of about 0.005 in. (0.127 mm) to 0.010 in. (0.254 mm). and most preferably about 0.005 in. One example of the thin film material is a high stability polycarbonate known as type T2F, which is available from GE Plastics. Other thermally stabilized films are also appropriate for this process. The thin film material 36 preferably includes registration holes 38 punched through the thin film material 36 for tool pinning registration.

Figure 4:
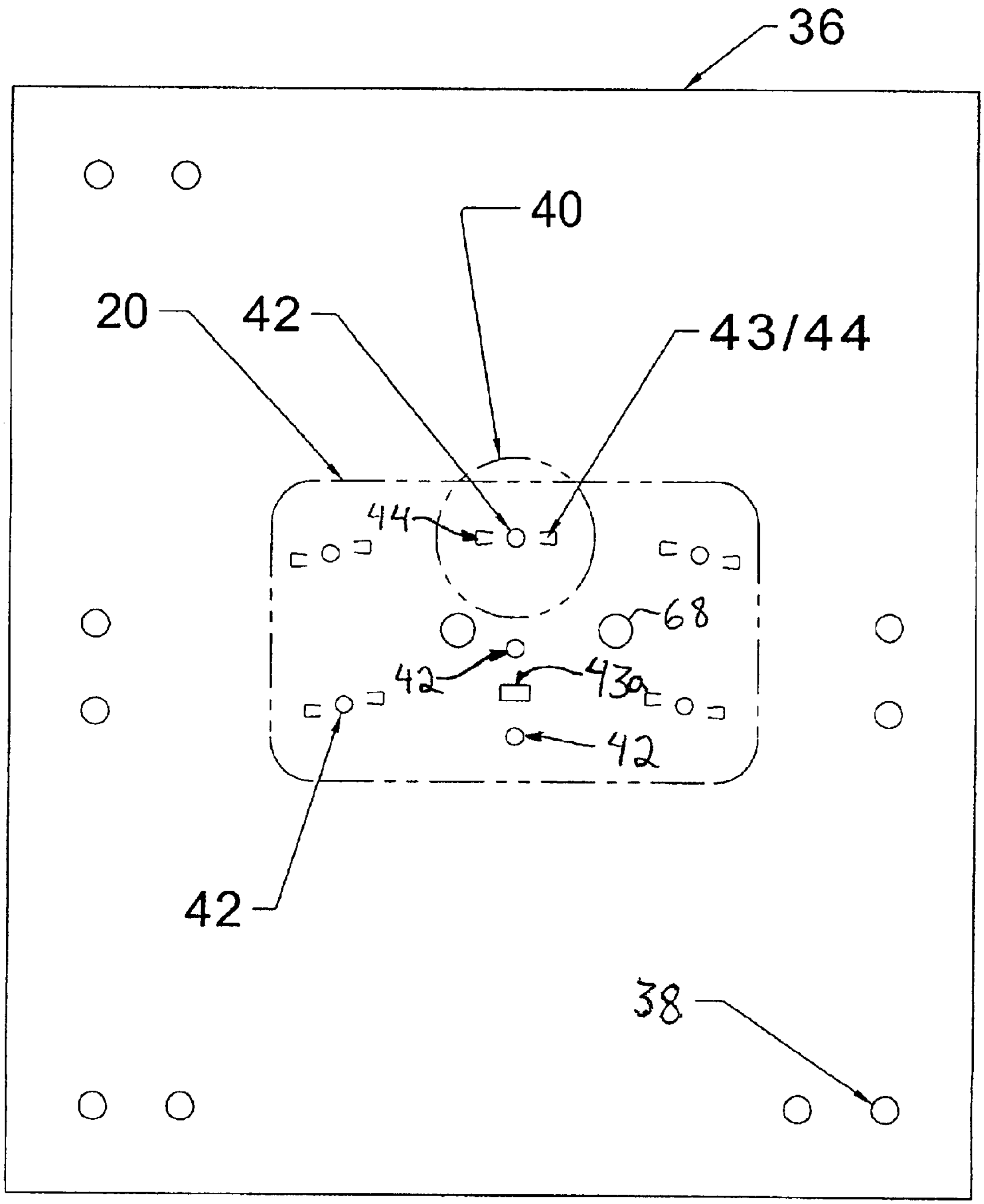
FIG. 4 is a plan view of the thin film material having keycap attachment regions formed thereon, according to one method of the present invention.
Figure 5:
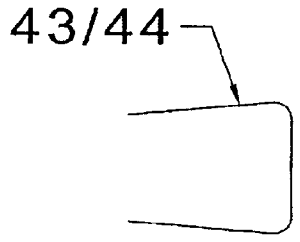
FIG. 5 is an enlarged plan view of a flap formed in the retainer sheet, according to one method of the present invention.
Figure 6:
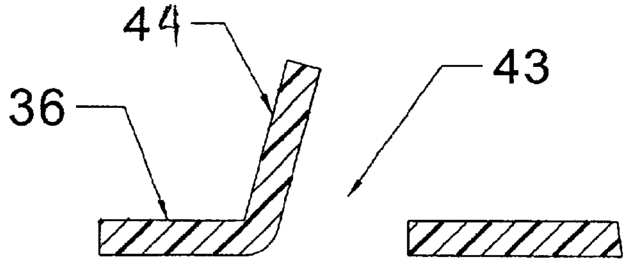
FIG. 6 is a side cross-sectional view of the flap formed in the retainer sheet.

The thin film material 36 is die cut to form keycap attachment regions 40 (FIG. 4). Each keycap attachment region 40 includes at least one hole 42 cut through the thin film material 36. Each keycap attachment region 40 also includes at least one molding material passage region 43 (e.g., a gate location) through which the molding material is injected, as described in greater detail below. In one embodiment, a flap 44 (FIGS. 5 and 6) is cut out from the thin film material 36 to create the material passage region 43. The flap 44 preferably has sides tapering inward toward the hinge such that the end of the flap is wider. This tapered design allows the flap 44 to anchor more securely in the keycap 26 and prevents the flap 44 from sliding out of the keycap 26. One example of the flap 44 is about 0.035 in. (0.889 mm) long.

Although the exemplary embodiment shows one hole 42 and two flaps 44 formed in each keycap attachment region 40, any number of holes 42 and/or flaps 44 can be formed depending upon the desired number of keycap anchor portions 30 and/or retainer anchor portions 32. Also, the holes 42 and/or flaps 44 can be formed with various positions and orientations. In another embodiment, for example on the keycap attachment region 40 for the center keycap 26*a*, the material passage region 43*a* (e.g., the gate location) can be formed without a flap. Alternatively, the keycap attachment region 40 can be formed with flaps 44 but no holes 42.

Figure 9:
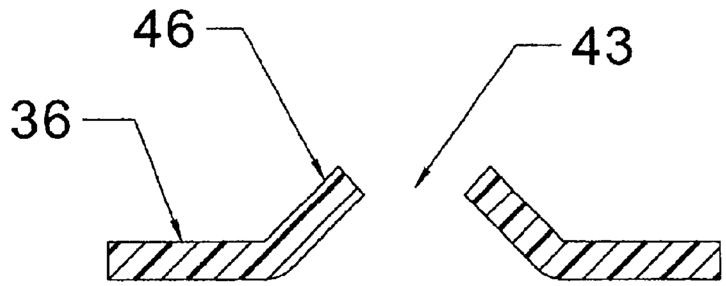
FIG. 9 is an enlarged cross-sectional view of a formed hole portion, according to an alternative embodiment of the present invention.

In another embodiment, a formed hole portion 46 (FIG. 9) is formed through the thin film material 36 to create the material passage region 43. The formed hole portion 46 is generally cone shaped and extends above the thin film material 36. In one example, the formed hole portion 46 has an inner diameter of about 0.025 in. (0.635 mm) and extends above the thin film material 36 about 0.015 in. (0.381 mm).

Figure 7:
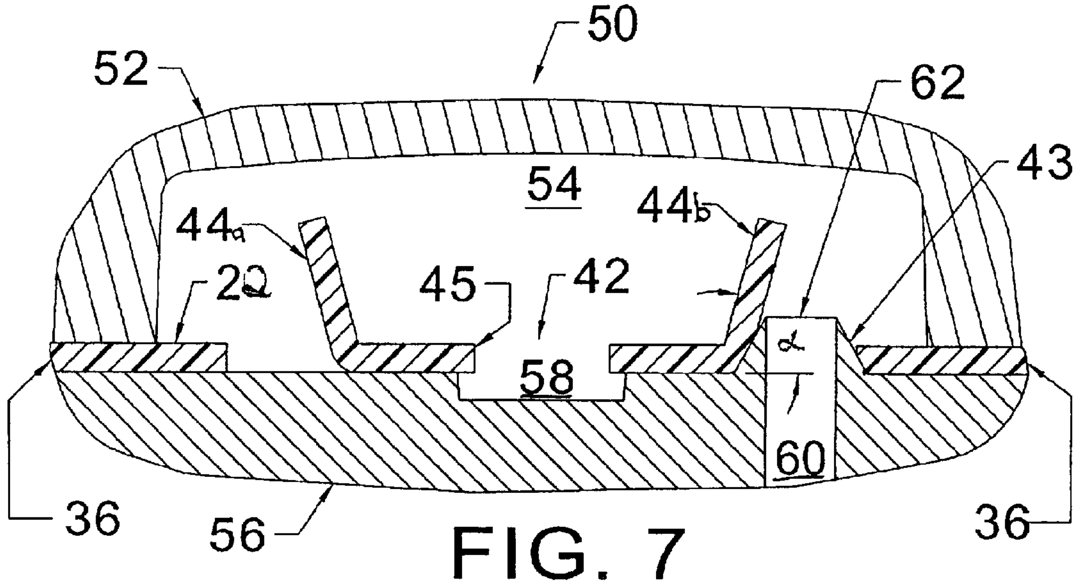
FIG. 7 is a cross-sectional view of a molding tool having a retainer sheet placed therein, according to one method of the present invention.
Figure 8:
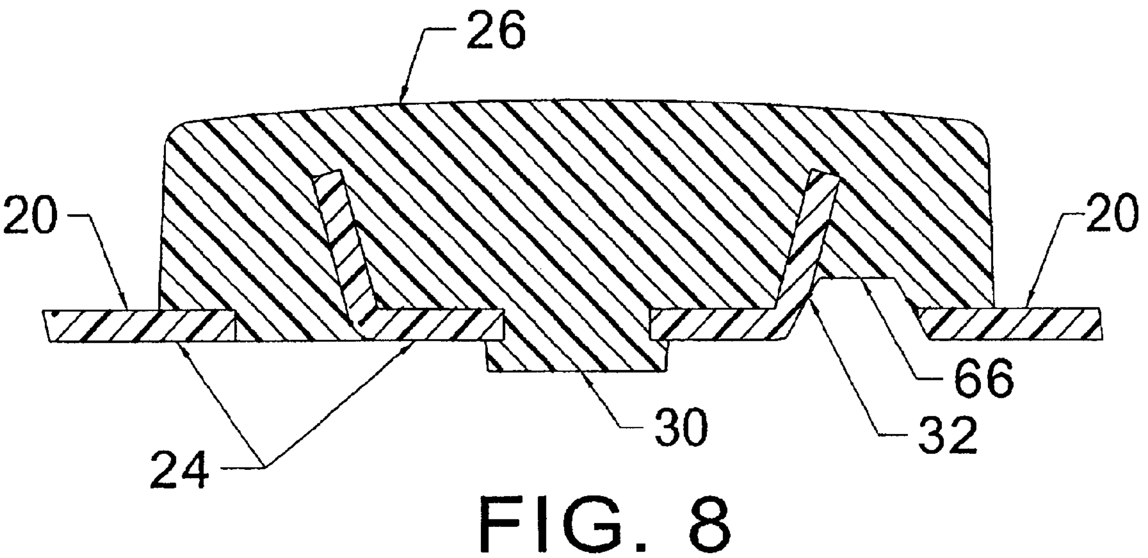
FIG. 8 is a cross-sectional view of a key molded onto the retainer sheet, according to one embodiment of the present invention.

The thin film material 36 is then placed into a molding tool 50 (FIG. 7). The preferred embodiment of the molding tool 50 includes a female side 52 having keycap mold cavities 54 and a male side 56 having anchor mold cavities 58. Although only one set of cavities 54, 58 is shown, the molding tool 50 preferably includes cavities 54, 58 for each of the keycaps 26 to be molded onto the retainer sheet 20. The keycap mold cavities 54 and the anchor/actuator mold cavities 58 can have different shapes and sizes depending on the shapes of the keycaps 26 and tactile features to be actuated. The molding tool 50 also includes injection passageways 60 and gates 62 that extend into the respective keycap mold cavities 54. Other embodiments of the molding tool 50 are also contemplated.

The thin film material 36 is placed in the molding tool 50 such that each hole 42 is positioned between a respective keycap mold cavity 54 and anchor/actuator mold cavity 58. Each gate 62 preferably pushes at least one of the flaps **44*b* open to form the material passage region 43 that receives the gate 62 (i.e., with the flap 44*b* acting as a gate door). The flap 44*b* preferably forms an angle a with respect to the retainer sheet 20** in the range of about 30° to 120°, and most preferably about 45°.

The molding material (e.g., plastic) is then injected through each injection passageway 60 and gate 62 and flows into each keycap mold cavity 54. The molding material fills the keycap mold cavity 54, passes through the hole 42 in the thin film material 36, and fills the anchor/actuator mold cavity 58 surrounding the edges 45 of the thin film material 36 around the hole 42. The molding material also flows around the flaps 44 to create the retainer anchor portions 32.

Figure 10:
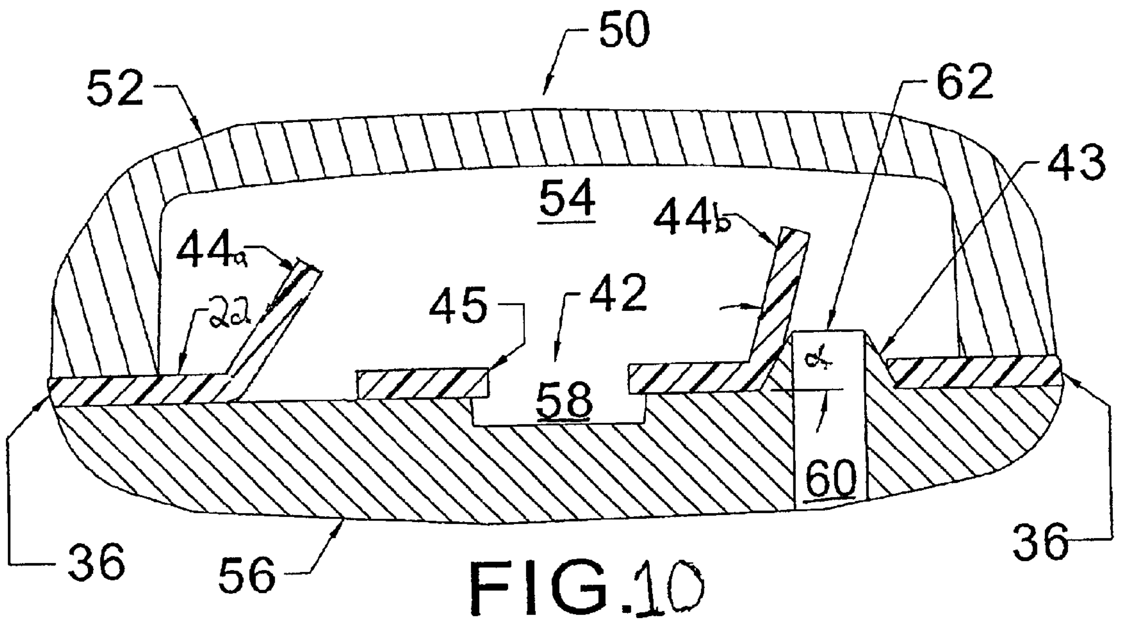
FIG. 10 is a cross-sectional view of a key molded onto the retainer sheet, according to another embodiment of the present invention.

In another embodiment shown in FIG. 10, the flap **44*a* has the same orientation as the flap 44*b* (i.e., flap 44*a* facing flap 44*b*). In this embodiment, the molding material flows under the flap 44*a* to prevent the flap 44*a*** from folding downward during the molding process.

When the molding material hardens, the female side 52 and male side 56 of the molding tool 50 are removed. In this embodiment, the gate tear away 66 is preferably within the body of the keycap 26 and excess material is removed from the location of the gate tear away 66. Flashing is also removed from the keycaps 26. The keycap anchor/actuator portion 30 extends below the retainer sheet 20 and is secured against the bottom surface 24 of the retainer sheet 20. In this embodiment, the flaps 44 are molded within the keycap 26 to form the retainer anchor portions 32.

In an alternative embodiment, the formed hole portion 46 (see FIG. 9) can be molded within the keycap 26. In this embodiment, the molding material flows into the cone of the formed hole portion 46 to form an anchor portion or rivet.

The thin film keypad 10 can then be decorated with numerous finishing techniques, such as metal plating, painting, screen or pad printing and laser etching. Other decorating options are also contemplated. Because the decoration is provided directly on the keycaps 26 after the molding, and the thin film is not stretched, the keypads made according to the present invention retain graphic quality.

After the molding operation, the outline of the retainer sheet 20 is cut from the thin film material 36, for example, using a die cut operation. Also, one or more additional holes 68 can be cut in the retainer sheet 20. Although the preferred method cuts the outline of the retainer sheet 20 as the final die cut operation, the outline can also be cut prior to the molding operation. The thin film keypad 10 made according to the method described above can then be assembled into an electronic device.

In one example, the keycap 26 has a length of about 7 mm long and a width of about 2.5 mm wide. The method of the present invention allows the keycaps 26 to be molded with a relatively unlimited height (as compared to the IMD process). In one example, the height of the keycaps 26 can be in the range of about 1.5 mm to 10 mm. The exemplary keycap anchor/actuator portion 30 has a diameter of about 0.061 in. (1.5 mm), although the designer may adjust this dimension to meet actuation requirements of design and substrates to be actuated. Other dimensions of the keycaps 26 are also within the scope of the present invention.

Accordingly, the thin film keypad of the present invention is able to meet the small size requirements of current electronic devices while providing keycaps that are securely mounted.

Modifications and substitutions by one of ordinary skill in the art are considered to be within the scope of the present invention, which is not to be limited except by the following claims.

The invention claimed is:

1. A method of making a thin film keypad comprising:

forming at least one keycap attachment region on a thin film material, each said keycap attachment region including at least one molding material passage region, wherein forming said keycap attachment region includes cutting at least one flap from said thin film material to form said material passage region;

placing said thin film material into a molding tool having at least one keycap mold cavity such that each said molding material passage region is located within each said keycap mold cavity, respectively, wherein said molding tool includes a gate for injecting said molding material, and wherein said gate is inserted through said material passage region such that said gate moves said flap into said keycap mold cavity; and injecting a molding material through said molding material passage region in said thin film material and into said keycap mold cavity such that at least one keycap is molded onto a top surface of said thin film material, and wherein said molding material flows around portions of said thin film material and hardens on opposite sides of said portions of said thin film material to form at least two anchor portions such that said keycap is mechanically secured to said thin film material, and wherein one of said anchor portions is formed by said molding material flowing around said flap and hardening on opposite sides of said flap.

2. The method of claim 1 further including cutting an outline of a retainer sheet from said thin film material such that said keycap is molded onto said retainer sheet.

3. The method of claim 1 wherein said molding material is selected from the group consisting of polycarbonate, polycarbonate/ABS blend, and ABS.

4. The method of claim 1 wherein said thin film material is selected from the group consisting of a polycarbonate material and a polyester material.

5. The method of claim 2 wherein forming each said keycap attachment region includes forming at least one hole through said thin film material, and wherein said retainer sheet is placed in said molding tool with said hole positioned between said keycap mold cavity sad an anchor mold cavity such that said molding material flows through each said hole and around an edge of said thin film material to form one of said anchor portions.

6. A method of making a thin film keypad comprising:

forming a plurality of keycap attachment regions on a thin film material, each of said keycap attachment regions including at least one hole and at least one material passage region, wherein said material passage regions are formed by cutting flaps from said thin film material;

placing said thin film material into a molding tool including a female side having keycap mold cavities and a male side having anchor mold cavities, wherein said male side of said molding tool includes gates for injecting said molding material, wherein said retainer sheet is positioned such that said holes are located between respective said keycap mold cavities and said anchor mold cavities and such that said material passage regions are located within respective said keycap mold cavities, and wherein said gates are inserted through respective said material passage regions such that said gates move respective said flaps into respective said keycap mold cavities; and injecting a molding material through said material passage regions in said thin film material and into said keycap mold cavities, wherein said molding material flows through said holes around said flaps and into said anchor mold cavities such that keycaps are molded onto a top surface of said thin film material and are mechanically secured to said thin film material.

7. The method of claim 6 wherein said thin film material is selected from the group consisting of a polycarbonate material and a polyester material, and wherein said molding material includes ABS.

8. The method of claim 6 wherein forming said material passage regions includes forming formed hole portions from said thin film material, wherein said male side of said molding tool includes gates for injecting said molding material, and wherein inserting said thin film material into said molding tool includes inserting said gates through respective said material passage regions such that said molding material flows around said formed hole portions.

9. The method of claim 6 further including cutting an outline of a retainer sheet from said thin film material such that said keycaps are molded onto said retainer sheet.

* * * * *

UNITED STATES PATENT AND TRADEMARK OFFICE

CERTIFICATE OF CORRECTION

PATENT NO. : 6,821,467 B2
DATED : November 23, 2004
INVENTOR(S) : Wolfe et al.

It is certified that error appears in the above-identified patent and that said Letters Patent is hereby corrected as shown below:

Column 6,
Line 47, delete the word "sad" and insert the word -- and --.

Signed and Sealed this

Twenty-sixth Day of April, 2005

JON W. DUDAS
*Director of the United States Patent and Trademark Office*